United States Patent [19]

Gail

[11] 4,048,685

[45] Sept. 20, 1977

[54] TRAILABLE HOUSEBOAT

[76] Inventor: William A. Gail, 7212 Natalie Blvd., Northfield, Ohio 44067

[21] Appl. No.: 653,381

[22] Filed: Feb. 12, 1976

[51] Int. Cl.² .................. B63C 13/00

[52] U.S. Cl. .................. 9/1.2; 114/61

[58] Field of Search .................. 9/1.1, 1.2, 6 P, 6 M; 114/61; 115/1 R, 1 B, 1 A; 214/1 A; 280/414 R, 414 A; 296/23 R, 23 B

[56] References Cited

U.S. PATENT DOCUMENTS

| | | | |
|---|---|---|---|
| 3,079,616 | 3/1963 | Byberg | 9/1.2 |
| 3,090,975 | 5/1963 | Franks | 9/1.2 |
| 3,143,992 | 8/1964 | Beams | 114/61 |
| 3,195,154 | 7/1965 | Swanson | 9/6 P |
| 3,308,782 | 3/1967 | Dahl | 115/1 R |
| 3,427,671 | 2/1969 | Livaudais | 9/6 M |
| 3,496,689 | 2/1970 | Nerem | 296/23 R |
| 3,860,982 | 1/1975 | Rumsey | 9/1.2 |

*Primary Examiner*—Trygve M. Blix
*Assistant Examiner*—Sherman D. Basinger
*Attorney, Agent, or Firm*—McNenny, Pearne, Gordon, Gail, Dickinson & Schiller

[57] ABSTRACT

A trailable houseboat is disclosed combining a travel trailer module and pontoons which are positioned along the roof of the trailer module cabin for land use. Such pontoons are supported by a power operated mechanism so that they can be moved from the highway position to a launch position, in which they extend along the sides of the cabin at a level sufficiently low to permit floating of the boat but sufficiently high to allow the boat to be rolled on its wheels. After launching, the trailer module is raised with respect to the pontoons to increase the freeboard and to raise the road wheels up out of the water. Folding decks are positioned adjacent to the ends of the cabin for highway use and extend between the ends of the pontoons in the water configuration. Folding walkways are also provided for water use to cooperate with the ends of the pontoons and the decks to provide a large level deck system completely around the cabin. The pontoons are shaped to nest with the cabin so that the height of the trailer module is not substantially increased in the highway configuration, even though the pontoons have a depth at their ends to provide substantial freeboard in the water configuration. In the highway configuration, the ends of the pontoons project below the roof line of the cabin to lower the center of gravity. The pontoons and the cabin are all provided with positive buoyancy for safety and strength by utilizing closed cell foam. A single hydraulic actuator is connected to move the pontoons between the three positions and to raise and lower the decks. The raised ends of the pontoons provide accessible storage space.

25 Claims, 15 Drawing Figures

79
47
34
10
76
78
22
24
23
17
21
R
10
58
41
46
48a
46
56a
54
47
L
48
53
56
52
49
94
11

L
57
12
W

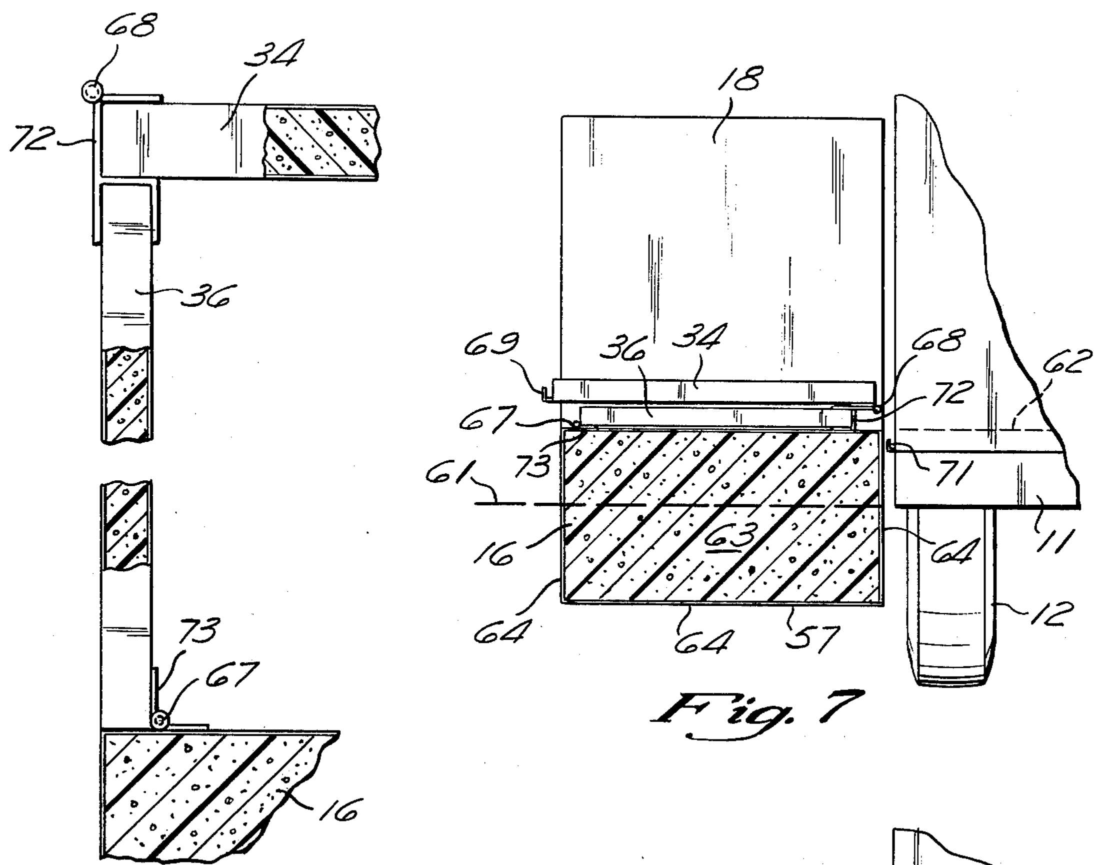
Fig. 7
Fig. 8a
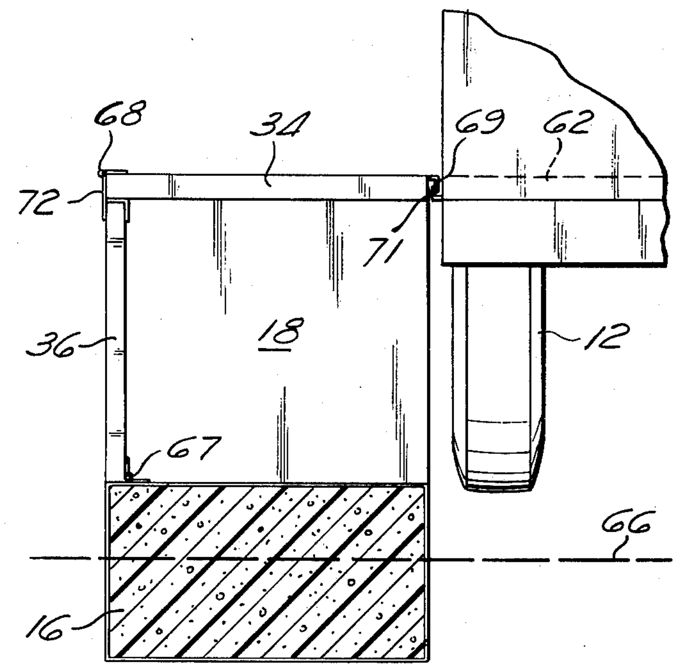
Fig. 8
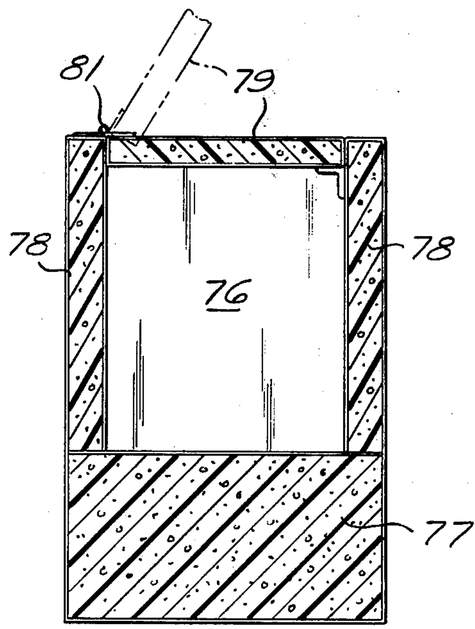
Fig. 9

88
89
86
87
11
53a
53b
82
84
83
53c
53d
91
93
92
94
59

32
32
F
106
109
108
10
18
113
111
103
112
E
101
102
32
104
103
116
114
112
111
18

TRAILABLE HOUSEBOAT

BACKGROUND OF THE INVENTION

This invention relates generally to trailable boats and, more particularly, to a novel and improved trailable boat which folds for road travel and which extends for water use to provide substantial usable cabin space and deck space.

PRIOR ART

Laws regulate the maximum width of vehicles which can be regularly hauled over the roads. Such maximum in the United States is 8 feet. Even wider vehicles can be moved over the road with special wide-load permits, but obtaining some permits for each road use is not practical. Consequently, trailable boats are designed so that their width does not exceed the eight-feet road limitation.

The 8-foot road limitation presents severe limitations on the size of conventional hull boats, which may be made, and even the larger trailable boats do not provide comfortable and adequate living quarters. Further, long, narrow boats tend to present stability problems in use.

In the U.S. Pat. to Livingstone, No. 3,172,134 dated Mar. 9, 1965, a trailable, amphibious vehicle is disclosed including pontoons, which are raised and positioned along the roof of a cabin when the vehicle is on the road so that the vehicle width approximates the width of the cabin or house of the trailed vehicle. Such pontoons are pivoted down to a launch position adjacent to the sides of the cabin in which position the pontoons are above the bottom of the trailer wheels, but sufficiently low to support the vehicle in the water with the cabin floor above the water.

After the vehicle is rolled on its wheels into the water, the cabin and wheels are raised up to a water position with the wheels substantially out of the water and the floor of the cabin is spaced up from the water an increased distance. Folding decks extend between the pontoons both in front and in back of the cabin and in cooperation with the upper surfaces of the pontoons, provides a deck assembly completely around the cabin.

In this system, the entire pontoon is located above the cabin roofline in the road position so the depth of the pontoon must be limited to keep the road configuration of the vehicle from becoming too high. Consequently, the decks and floor of the vehicle are low in the water position. Also, the pontoons provide little freeboard.

In the boats actually marketed by Livingstone, the relative movement between the cabin and pontoons between the launch and water positions was used to raise and lower the rearward deck with the outboard motor mounted thereon.

Further, in the boats marketed by Livingstone, the decks were located above the upper surface of the pontoons, apparently to increase the spacing of the deck surface above the water and this resulted in a step down to the pontoon surface so that the deck system was not level.

SUMMARY OF THE INVENTION

There are a number of aspects to the present invention. In accordance with one important aspect of this invention, a trailable boat is provided in which pontoons are raised and positioned on the roof of the cabin for road travel and wherein the pontoons are shaped to nest with the cabin so that even pontoons of substantial depth required to provide substantial freeboard do not excessively increase the overall height of the vehicle in the road configuration.

In the illustrated embodiment, pontoons having one depth at their end portions forward and rearward of the cabin are provided with a central portion of reduced depth. The pontoons nest with the cabin and extend above the cabin roof a height equal to about one-third of the pontoon depth at their ends.

In the raised road position, the ends of the pontoons project down below the roof level of the cabin, but in the lowered water position, the upper surfaces of the pontoon ends are substantially level with the cabin floor. Consequently, the floor is raised above the water level a distance equal to the full freeboard height of the pontoons. With such structure, substantial freeboard is provided (about thirty inches in the illustrated embodiment) but the height of the vehicle above the roof line is only increased a relatively small amount (about sixteen inches in the illustrated embodiment).

The structure has the affect of lowering the center of gravity of the raised pontoons and promotes greater road stability of the vehicle. Also, the lateral area exposed to side wind loading is reduced compared to pontoon systems which do not nest. This also improves road stability.

In the illustrated embodiment, the depth of the center pontoon section is selected so that the water level is substantially adjacent to the upper surface of the central portion. Consequently, this central section does not provide substantial reserve buoyancy, and the pontoons cut through the waves and provide a very stable and smooth ride, even in rough water. The pontoon ends, however, provide considerable reserve buoyancy and provide adequate lift when large waves are encountered.

In accordance with another aspect of this invention, a pontoon structure is provided in which the end portions of the pontoon above the depth of the central portions and above the water line are hollow and accessible to provide substantial enclosed storage capacity when the boat is in the water. Such enclosed storage capacity is important in houseboats, and such storage is ample for storing provisions and equipment required for extended cruising.

In accordance with still another aspect of this invention, the pontoons along their lower main sections are constructed of closed cell foam such as styrafoam, urethane foam, or the like, enclosed with a sheet skin such as aluminum or other suitable sheet material. With such structure, very high strength is obtained with light weight. Consequenty, the overhead load in the road position is not excessive. Further, with such structure, the foam is relied upon for buoyancy and the pontoons are virtually unsinkable, even when damaged.

In accordance with still another aspect of this invention, folding walkways and decks are provided which cooperate with the upper surface of the pontoon end portions to provide a continuous single level deck surface entirely around the cabin. In the boat configuration, the width of the decks is equal to the width of the cabin plus the width of the two pontoons. In the illustrated embodiment, the decks are approximately twelve feet wide with a forward deck about eight feet long and the stern deck about five feet long. The walkways extend over and bridge the central portion of the pontoons and are spaced at a level substantially above the upper surface of the central portion of the pontoons. The decks and walkways fold during road travel with the decks folding against the ends of the cabin and the walkways folding in to maintain the required road width of no more than 8 feet.

In the preferred embodiment, the walkways are provided with side panels which close the sides of the central portion of the pontoons. Here again, the walkway panels and decks are formed of closed cell foam enclosed with sheet material such as aluminum or wood panels.

In accordance with another aspect of this invention, the forward deck is formed of two panels which fold against the forward cabin and beneath the overhanging pontoon ends. Such panels extend in the water position to provide a forward deck surface of substantial length. Further, a forward deck roof is provided which folds against the end of the cabin and behind the forward deck when the boat is in the road configuration. Such forward roof, in the illustrated embodiment, is formed of three panels which fold laterally so that they fit in between the pontoons for road travel, but extend to a width greater than the width of the cabin for water use. The roof is supported for water use by removable tubular members which also constitute a part of the railing system for the boat.

In accordance with still another aspect of this invention, the relative movement between the cabin and the pontoons between the launch position and the water position is used to fold and extend both the forward deck and the stern deck.

These and other aspects of the invention are described more fully in the following specification and drawings.

BRIEF DESCRIPTION OF THE DRAWINGS

FIG. 7 is a fragmentary cross section through the central portion of the pontoon illustrating the pontoon in the launched position with the walkways folded;

FIG. 8 is a view similar to FIG. 7, illustrating the pontoon in the water position with the walkways extended for water use;

Figure 10:
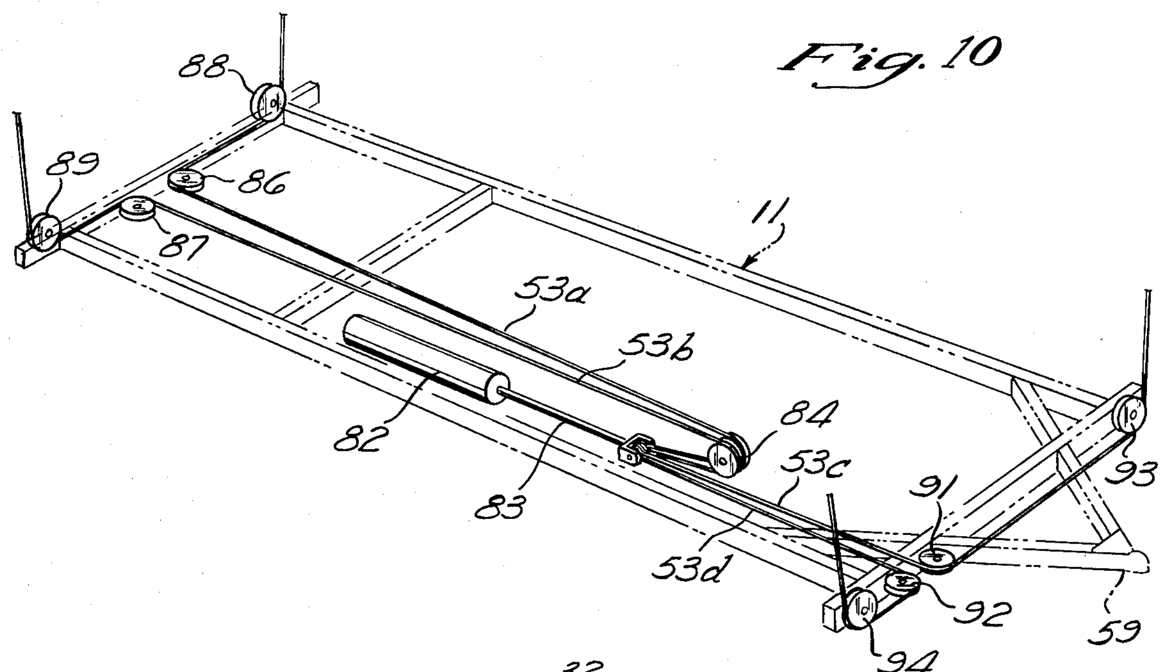
Figure 11:
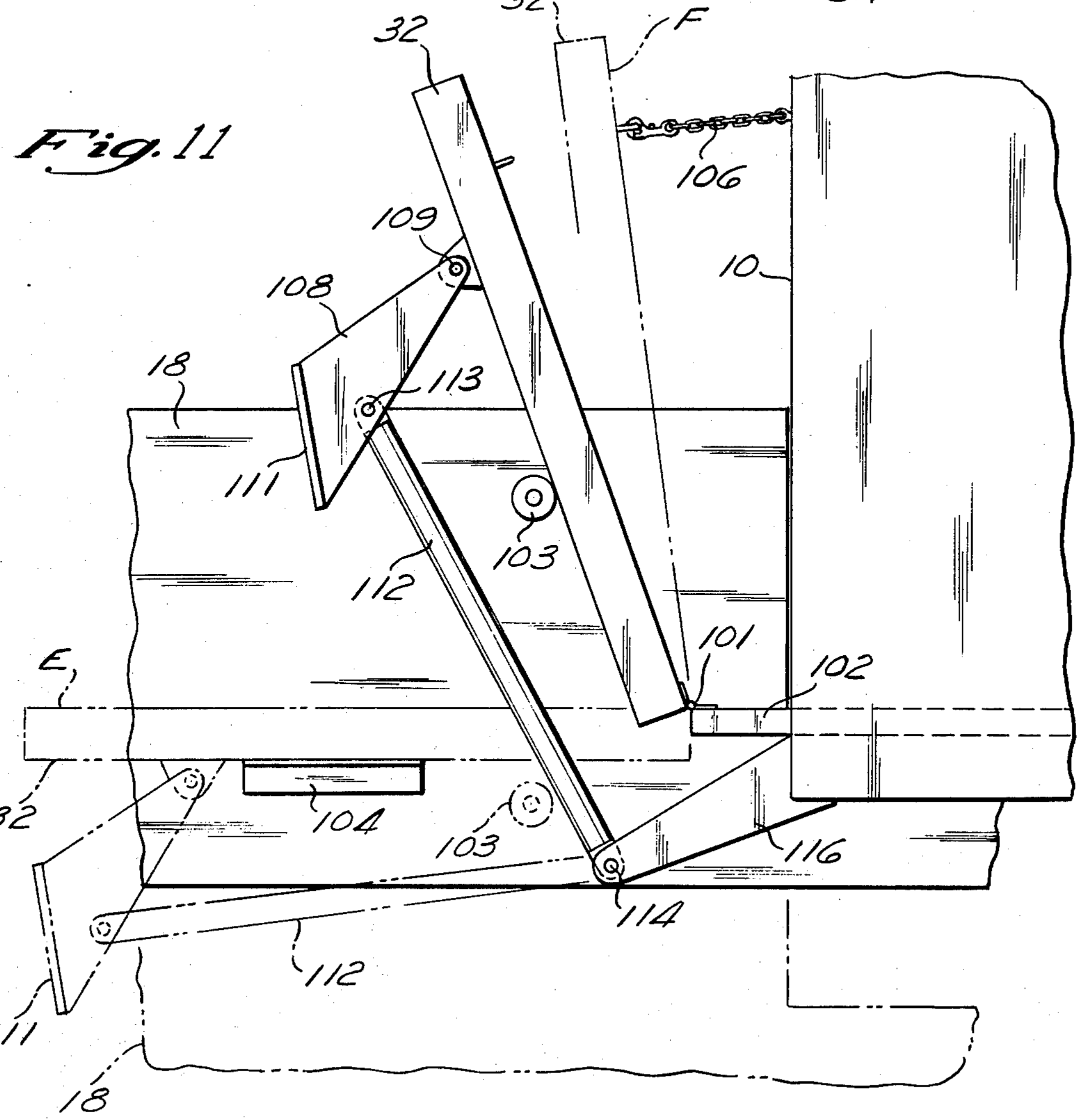
Figures 12, 13:
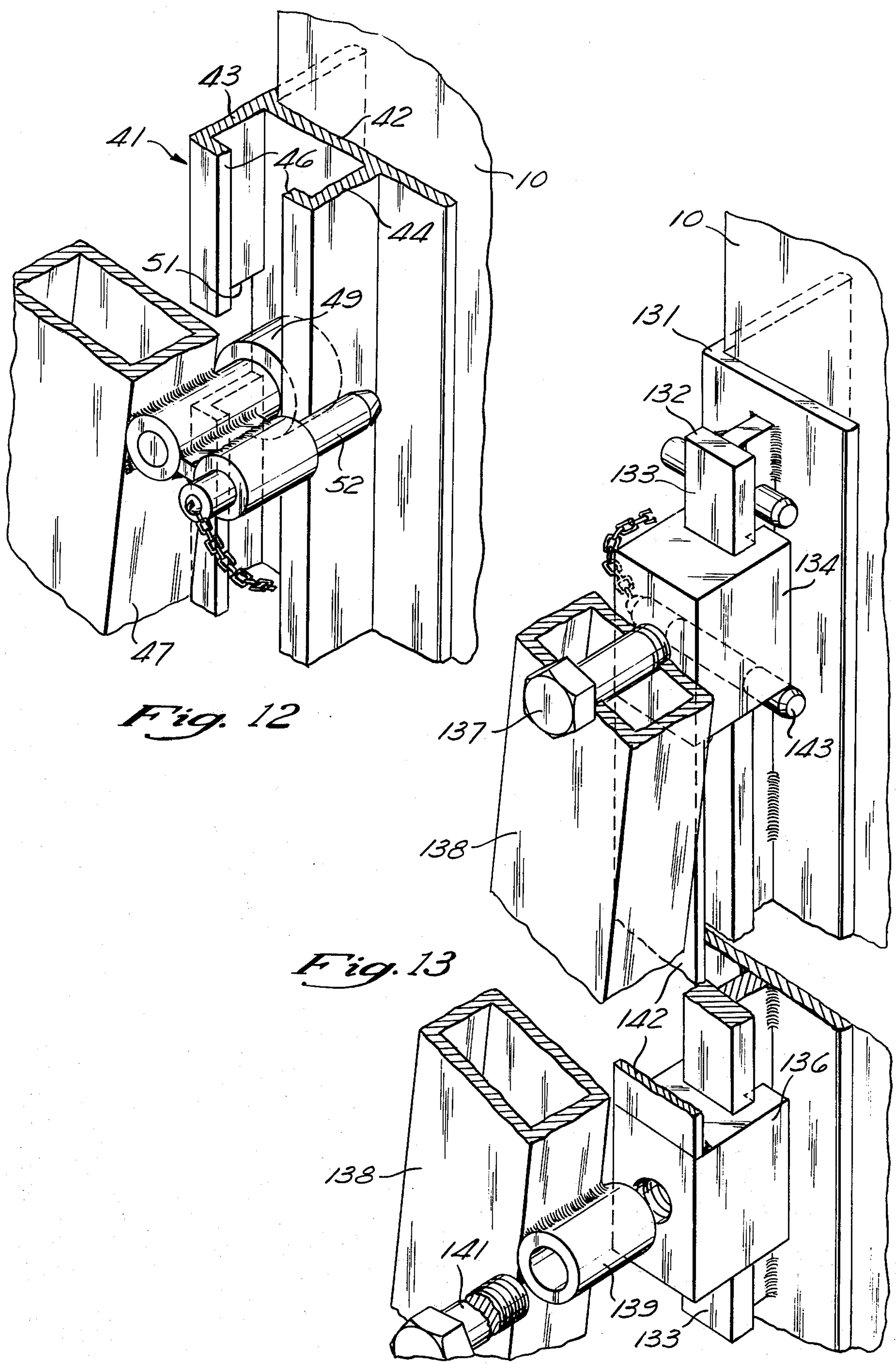

FIG. **8*a*** is an enlarged fragmentary view illustrating the hinge arrangement for the walkways;

FIG. 9 is a cross section through the end of a pontoon illustrating the storage space provided in such end portions;

FIG. **9*a*** is a fragmentary perspective view illustrating the forward storage compartment of one pontoon;

FIG. 10 is a schematic perspective view of the cable system utilized to power the pontoons between the various positions;

FIG. 11 is an enlarged fragmentary side elevation illustrating the mechanism for raising and lowering the rearward deck and the transom system for supporting an outboard motor thereon;

FIG. 12 is an enlarged fragmentary perspective view of the panel support channel and lower roller illustrating one structure for locking the lower roller within the channel when the pontoon is in the launch position; and, FIG. 13 is an enlarged fragmentary perspective view of a modified form of pontoon support system.

DETAILED DESCRIPTION OF THE DRAWINGS

Referring to FIGS. 1 through 5, the illustrated embodiment of this invention includes a generally rectangular cabin or house 10, mounted on a trailer frame 11 and provided with road wheels 12. The cabin 10, frame 11 and road wheels 12 constitute a travel trailer having typical furnishings including a living area, sleeping facilities, cooking and eating facilities, and toilet facilities. In the illustrated embodiment, the cabin is slightly less than eight feet wide and is about twenty feet long. Preferably, the cabin is structured to provide a roof of sufficient strength to permit its use as a sun deck when the boat is in the water. The cabin is formed of panels formed by laminating internal and external sheets to a closed-cell foam such as styrafoam, since such structure provides substantial strength with relatively light weight. Further, such structure provides additional safety in water use, since the cabin structure itself is buoyant in the event the pontoons are ripped away in a storm or the like.

A pair of similar but opposite pontoons 13 and 14 are mounted on the main trailer assembly by a mechanism (described in greater detail below) so that they are located along the roof of the cabin 10 in the road position of FIGS. 1 and 4. In such position, the pontoons nest with the cabin and provide a center section 16 of reduced depth which fit along the roof of the cabin. The pontoons provide forward and rearward end portions 17 and 18 of a greater depth which extend beyond the ends of the cable 10 and project down below the roof line of the cabin when in the road position.

In the illustrated embodiment, the center portion has a depth in the order of fourteen inches and the end portions 17 and 18 have a depth in the order of 38 inches The width of the pontoons in the illustrated embodiment is in the oder of 26 inches.

Figure 1:
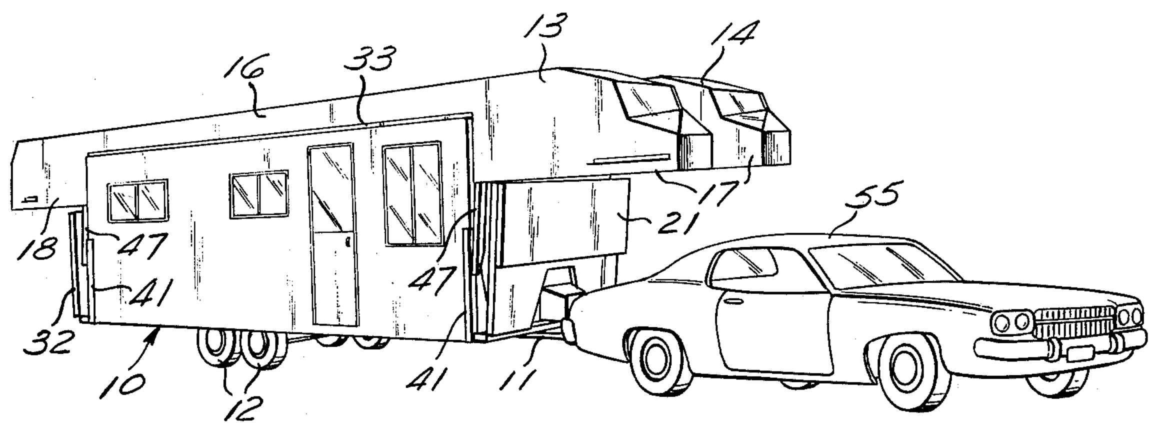
FIG. 1 is a perspective view illustrating a trailable houseboat incorporating the present invention in the road configuration with the pontoons positioned along the cabin roof and the decks folded against the ends of the cabin.
Figure 4:
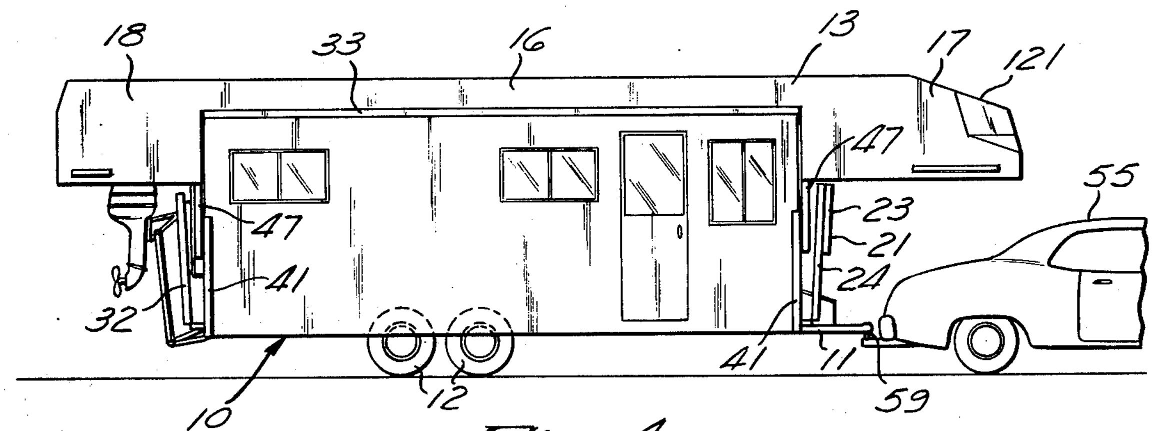
FIG. 4 is a side elevation illustrating the boat in the road configuration.
Figure 2:
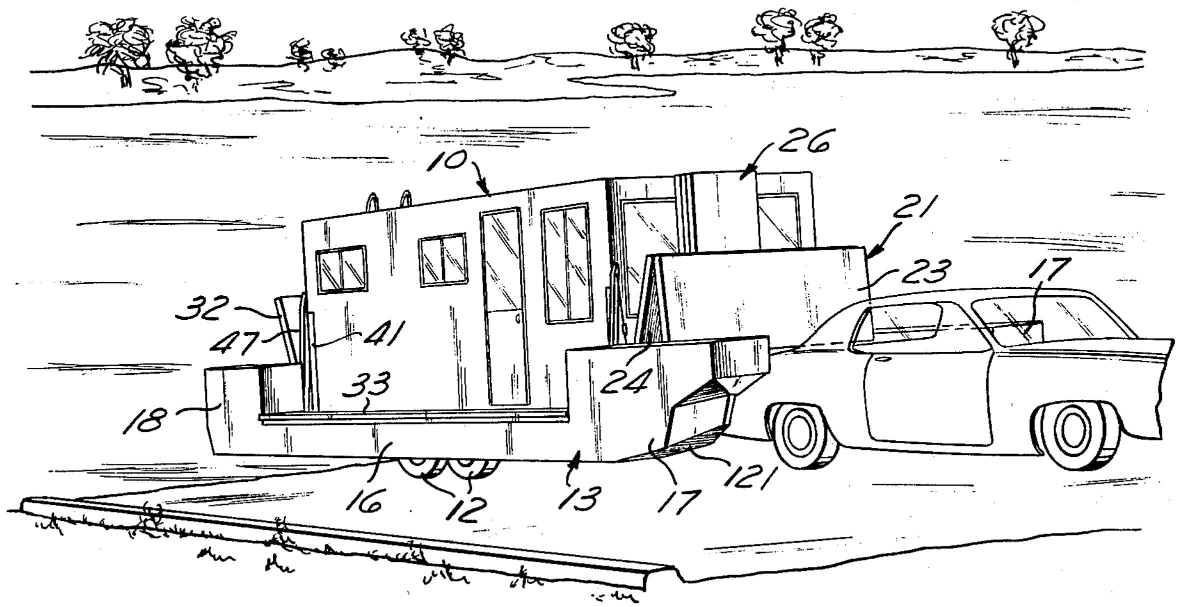
FIG. 2 is a perspective view similar to FIG. 1, but illustrating the boat in the launched configuration in which the pontoons are positioned adjacent to the sides of the cabin with the pontoons above the bottom of the wheels so that the boat can be rolled into and out of the water.

The pontoons are movable from the road position of FIGS. 1 and 4 to a launch position of FIG. 2, in which they extend along the sides of the cable 10. In such position, the bottoms of the pontoons are spaced from the roadway and are above the bottoms of the road wheels 12 so that the boat can be rolled into and out of the water. The pontoons provide sufficient displacement, however, so that the boat floats in the launch position with the floor of the cabin out of the water and the wheels 12 projecting down into the water. In the illustrated embodiment, the pontoons support the boat in the launch position with a draft in the order of 8 to 12 inches, depending upon the loading of the boat.

Figure 5:
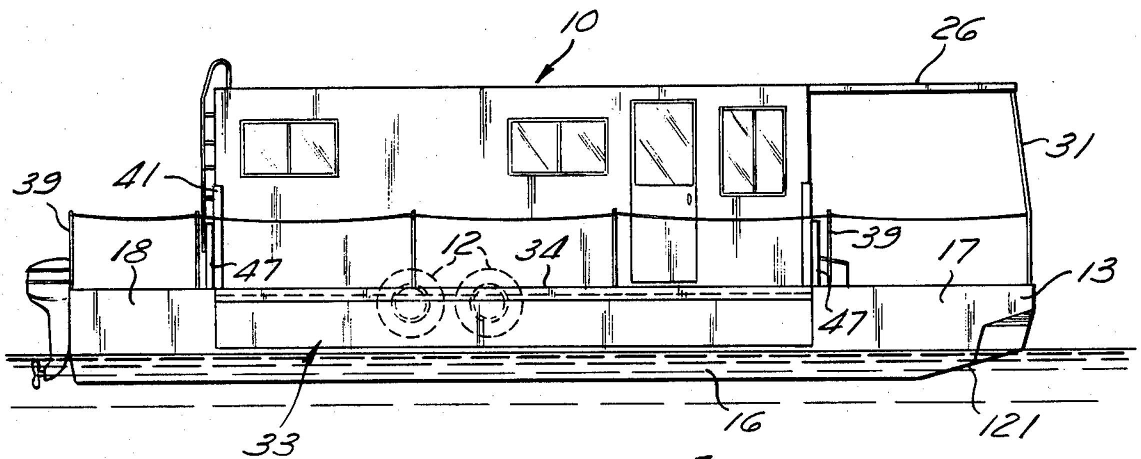
FIG. 5 is a side elevation of the boat is the water configuration.
Figure 3:
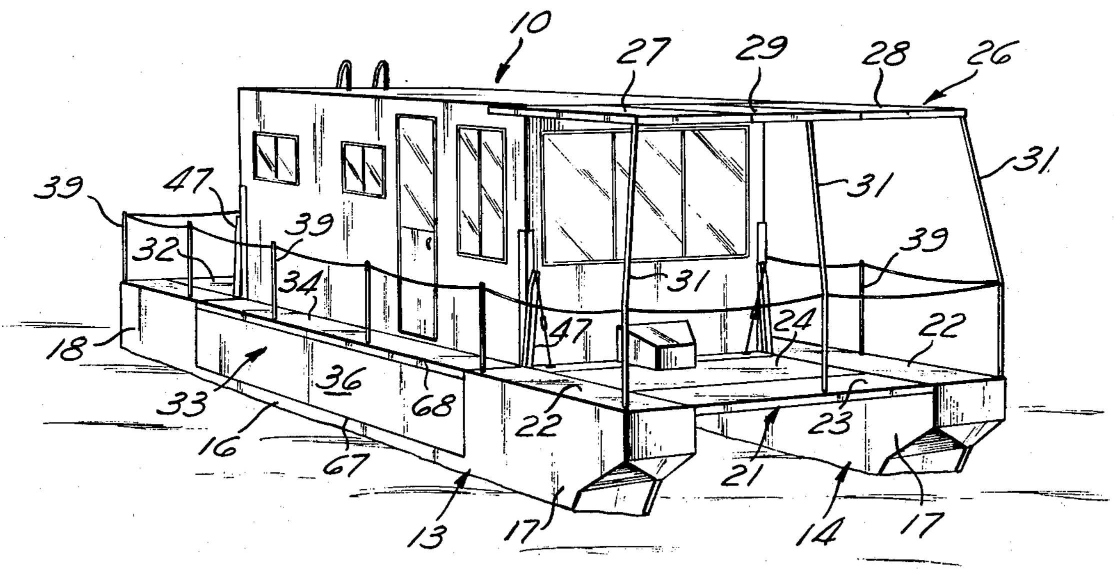
FIG. 3 is a perspective view similar to FIGS. 1 and 2, but illustrating the boat in the water configuration.

While the boat is floating on the pontoons, the cabin 10, frame 11 and wheels 12 are raised until the floor of the cabin is substantially level with the upper surfaces of the end portions 17 and 18 of the pontoons, as illustrated in FIGS. 3 and 5. In such position, the wheels 12 are raised up out of the water and substantial spacing is provided between the cabin and the water.

A forward deck assembly 21 is hinged on the forward end of the cabin 10 and is movable to a folded position, illustrated in FIG. 1, adjacent to the forward end of the cabin. In the water position, the forward deck 21 bridges between the two forward end portions 17 of the pontoons and in cooperation with the upper surface 22 of the pontoon ends 17, provides a level forward deck. In the illustrated embodiment, the forward deck 21 consists of two panels 23 and 24, which are hinged together so that the panel 23 extends downwardly from the upper edge of the panel 24 when in the folded position. The panel 24 is proportioned so that the forward deck 21 fits below the end portions 17 of the pontoons in the road position.

A roof assembly 26 folds down between the forward deck 21 and the forward end of the cabin 10 in the road position and in the launch position. Such assembly includes three panels, 27, 28 and 29, which are hinged together with the panel 28 hinged to one side edge of the panel 29 and the panel 27 hinged to the other side edge of the panel 29. In the folded position illustrated in FIGS. 1 and 2, the roof assembly is sufficiently narrow to fit between the two pontoons 13 and 14. After the boat is in the water configuration, the two panels 27 and 28 are folded out and provide a width greater than the width of the cabin 10. The roof assembly is then pivoted about its hinge connection at the forward end of the roof of the cabin 10 to a horizontal position and is held in such position by removable tubular supports 31. These tubular supports 31 are anchored at their lower ends adjacent to the forward end of the deck and at their upper ends in the forward edge of the roof assembly. Such tubular supports hold the roof assembly in its raised position of FIGS. 3 and 5, and also provide a portion of the railing assembly around the forward deck.

A rearward or stern deck 32 supports an outboard motor or the like on a parallelogram type transom mechanism described in greater detail below, and is movable between a folded position adjacent to the rearward end of the cabin and an extended position when the boat is in the water in which it bridges between the rearward end portions 18 of the pontoons and cooperates with the upper surfaces thereof to provide a level stern deck.

A folding walkway assembly 33 is provided along each side of the cabin. Each walkway assembly includes two panels which fold down into the center section of the pontoons as illustrated in FIG. 2, and are carried with the associated pontoons up onto the roof of the cabin for the road configuration. Each walkway assembly includes an upper panel 34 hinged to a side panel 36 along one edge at 68. The side panel 36 is, in turn, hinged to the center portion of the pontoons along a hinge line 67. When folded, such panels do not materially increase the center depth of the pontoons. However, when in the extended water position, the panels 34 bridge between the ends 17 and 18 of the associated pontoons and the side panels enclose the center section so that an appearance of a continuous solid pontoon having a full depth equal to the depth of the end portions 17 and 18 is provided.

Removable railing supports 39 are anchored in the pontoons, deck, and walkway assembly to support a railing system completely around the boat. Such railing system can be provided by tubular members or by rope as desired.

As mentioned above, the cabin dimensions of the illustrated embodiment are about 20 feet by 8 feet. In such embodiment, the length of the pontoons is about 33 feet with the overall width of the boat in the water position being about 12 feet. The forward deck is, therefore, about 12 feet wide and is about 8 feet long. The stern is also twelve feet wide and about 5 feet long. Such boat has ample deck space both at the bow and at the stern, and provides walkways along the sides of the cabin having ample width. Such boat is sufficiently large to permit extended cruising and to provide all of the various services necessary for comfortable living conditions. As mentioned previously, the roof of the cabin 10 also provides a deck surface and is, therefore, preferably structured to provide sufficient strength to support a number of people thereon. If desired, a flying bridge can be provided on the cabin roof, if its width, at least in the towing position, does not exceed the space between the pontoons in the road configuration. Preferably, the boat is powered by an outboard and is controlled from a main control station at the forward end of the cabin by flexible cables or the like.

Figures 6, 9A:
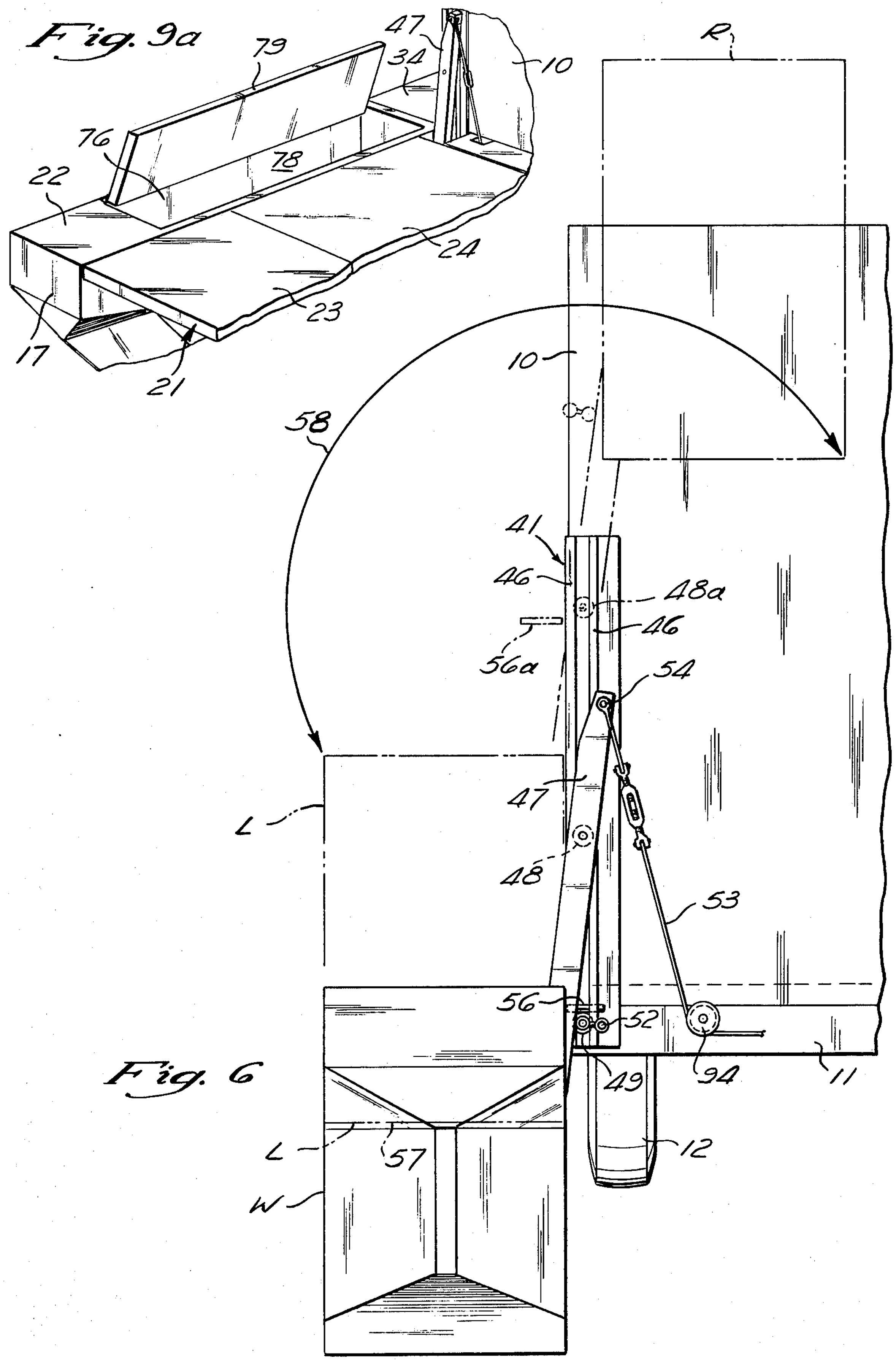
FIG. 6 is an enlarged fragmentary end view illustrating one pontoon in full line in the water position with the launch position and the road position illustrated in phantom.

FIGS. 6, 10 and 12 illustrate one form of powered mechanism which may be utilized to support the pontoons on the travel trailer portion of the boat. In this embodiment, a channel member 41 is secured to the frame 11 and cabin 10 at each corner of the cabin and extends vertically upward from the frame 11. Each channel provides an angle base section 42, which is securely fastened to the corner of the cabin and is connected at its lower end to the frame 11. A generally rectangular channel is provided by opposite wall portions 43 and 44 having inturned ends 46. A rectangular beam 47 is anchored at its lowered end in the associated pontoon. Two beams are provided for each pontoon with one adjacent to each end of the cabin, positioned so that a roller 48 is located within the associated channel. Such roller is proportioned to closely fit the channel and be capable of rolling up and down the channel. A second roller 49 is mounted on each beam at a location spaced from the first roller 48. The two rollers 48 and 49 on each of the beams are capable of rolling up and down the associated channel when the pontoons are moved vertically between the water position illustrated in full line in FIG. 6 at W and the phantom launch position illustrated at L. When in the launch position, the roller 49 is positioned at a cutout or window 51 in the sidewall 43, as illustrated in FIG. 12. Therefore, the roller 49 can move out of the channel to allow the beams and the pontoons supported thereby to be pivoted about the upper roller 48 to the road position illustrated in phantom at R. A lock pin 52 is removably positioned to engage the sidewall 44 and to maintain the roller 49 within the channel. When it is removed, the roller can move into and out of the channel through the opening 51 with the pivotal movement.

A cable system includes a cable 53 connected to each beam at a pivot point 54 spaced from the roller 48 on the side opposite the roller 49. The cables are connected to a single hydraulic cylinder actuator in a manner discussed below, and provides the power for moving the pontoons between their three positions in the following manner. In the water position, the two rollers are securely positioned between the two side walls 43 and 44 and a removable pin 56 extends through openings in the channel and engages the upper side of the roller 49 to prevent the roller from moving upwardly in the channel. A similar pin is located at each corner of the cabin and they cooperate to hold the pontoons in a locked condition in the water position.

When it is desired to lower the cabin to the launch position from the water position, the cables 53 are pulled in to lift the cabin slightly to relieve the load on the pins 56. The pins are then removed so that the rollers are free to roll up along the associated channels and the cabin system is suspended by the cables. During this operation, the lock pin 52 remains in position, but the engagement between the rollers 49 and the wall 43 hold the pin 52 clear of the wall 44.

The cabin is lowered by allowing the cables 53 to extend so that the weight of the cabin causes the cabin to move downwardly with respect to the pontoons until the launch position L is reached. In the launch position, the roller 49 is positioned adjacent to the opening 51, but cannot move out through the opening because the lock pin 52 engages the wall 44 and prevents such movement. In this condition, the wheels extend below the bottoms of the pontoons indicated by the dotted line 57. Therefore, the entire boat can be pulled up out of the water on its wheels. If the launching ramp is not too steep, it is possible to connect the towing vehicle 55 to the hitch 59 on the frame 11 before the boat is pulled out of the water. On the other hand, if the ramp is too steep, or if otherwise desired, the trailer can be pulled out by the tow vehicle, utilizing a bar connector or a cable connected between the frame 11 and the vehicle hitch. When the boat is pulled out with a tow bar or a tow cable, a caster wheel of the type normally provided on travel trailers is lowered to support the forward end of the boat as it is pulled up the ramp out of the water.

Before the boat is pulled out of the water, the pins 56 are positioned in the channel at the height shown in phantom at **56*a* in which they extend under the upper rollers 48, illustrated at 48*a* in the launch position. As the boat is pulled out of the water, the weight is transferred from the pontoons to the wheels 12 so the pin 56, which engages the lower side of the roller 48 in the launch position 48*a*, supports the weight of the pontoons. Similarly, after the pontoons leave the water, their weight tends to hold them down so that the force on the lock pins 52 is released. The lock pins 52 are then removed to allow the beams 47 to be pivoted about the axis of the roller 48 to swing the pontoons up onto the cabin roof, as illustrated at the position R. Such pivotal movement is provided by pulling on the cables 51 and causing the pontoons to swing up along the arc 58** through an angle of 180° until the pontoons are located on the roof.

Preferably, the structure is arranged so that the dead center of the cable system is reached before the center of gravity of the pontoons moves over the pivot roller **48*a*.** With such system, the pontoons are manually pushed over dead center onto the roof. This can be easily done because the system is close to the dead center condition.

When it is desired to lower the pontoons, the cable system is operated to pull the pontoons off the roof past their dead center position. The cables are then allowed to play out and allow the weight of the pontoons to lower the pontoons to the launch position L. The lock pins 52 are then inserted to lock the pontoons in the launch position and the boat is backed into the water. The transfer of the weight from the wheels to the pontoons relieves the load on the pins **56*a*, which are then removed from the upper position illustrated in phantom, and the cable system is operated to pull the house up with respect to the pontoons to the water position W. The completion of the launching and locking is provided by insertion of the lock pins 56** in the bottom position.

It should be understood that with the present system, the four cables 53 operate only in tension and that the weight of the cabin is utilized to lower the cabin from the water position to the launch position and the weight of the pontoons is utilized to lower the pontoons from the road position to the launch position. Consequently, a single acting actuator provides the power required to move the pontoons between the three various positions involved.

Referring to FIGS. **7, 8, 8*a* and 9*a*, the main section 16 of the pontoons is preferably rectangular in shape so that a maximum amount of buoyancy will be obtained for a given vertical height or depth. The end portion 18 extends substantially above the main or center portion 16. In FIG. 7, the pontoon is illustrated in its launch position in which the bottom 57 of the pontoon is located above the bottom of the road wheels 12. In this position, the side panel 36 rests along the upper surface of the central section 16 and the panel 34 extends horizontally along the upper surface of the panel 36. When in the water, the boat floats with a water line, as indicated by the dotted line 61, which is substantially along the lower surface of the frame 11 and below the floor 62** of the cabin.

Preferably, the pontoon is formed of closed-cell foam 63 with sheet material such as aluminum sheets or wood sheets 64, extending along the bottom, sides and top of the center section and bonded thereto. Such structure provides great strength with relatively light weight and provides for absolute buoyancy, since the skin or sheet material 64 is not depended upon for water-tight integrity. The panels 34 and 36 are also preferably formed of a foam core enclosed within sheet material such as aluminum.

When the cabin system is raised to the water position of FIG. 8, the pontoons float with the water line substantially as shown at 66, which is below the wheels 12 and substantially below the floor 62 of the cabin. In this position, the panel 36 is pivoted around its hinge line 67 to the vertical position and the panel 34 is pivoted around its hinged line 68 to a horizontal position, as illustrated in FIG. 8. A hook type member 69, provided at one end of the panel 34, rests in a channel 71 on the side of the cabin to support the inner edge of the panel 34. The outer edge of the panel 34 is supported by the panel 36 so that the panel 34 can carry the weight of people walking back and forth along the walkway.

The hinge structure of the two panels 34 and 36 is best illustrated in FIG. **8*a* wherein an upper hinge 68 is formed with an h section embracing the upper edge of the panel 36 and provides an upstanding section 72, which extends up to the hinge line 68. The location of the hinge line 68 at this point allows the panel 34 to be pivoted about the hinge line 68 through an angle of 270° between the folded position of FIG. 7 and the extended position illustrated in FIGS. 8 and 8*a*.**

A simple hinge 73 is provided to connect the panel 36 and the pontoon 16. In this instance, the hinge 73 is connected to the pontoons so that the hinge line 67 is spaced in from the other face of the pontoon so that when the panel 36 is in the vertical position, its outer face is aligned with the outer face of the pontoon 16.

Referring to FIGS. 9 and 9*a*, the ends of the pontoons are provided with storage space 76 above the main portion or lower section of the pontoon 77. Preferably, the lower portion of the pontoon 77 is provided with at least the same depth as the center sections 16 and side panels 78 enclose the storage section 76 to form the raised end portions 17 and 18 of the pontoons. Here again, panels 78 are formed with a foam core and a sheet skin or surface. A cover 79 is hinged at 81 and in its closed position provides part of the deck surface. However, the cover 79 can be raised to provide access to the storage space 76. Here again, the cover is preferably formed with a foam core and sheet skin structure for strength with minimum weight. Because the storage 76 is entirely foam enclosed, it can be used as an icebox.

In the illustrated embodiment, the ends 17 and 18 of each pontoon provides storage 76 so that ample storage is provided for any provisions or equipment that is required for extended cruising. However, such storage should not normally be used for road travel, excepting for very light items such as life preservers or the like, since any heavy materials located within the storage zones would tend to produce a topheavy condition for road travel.

FIG. 10 schematically illustrates the power system for moving the pontoons between the various positions described above. Such system includes a hydraulic cylinder 82 mounted on the frame 11 adjacent to one of the longitudinal frame members. Connected to the piston 83 of the actuator are four cables 53*a* through 53*d.* The two cables 53*a* and 53*b* extend forward over pulleys 84 and then backwardly along the frame and around pulleys 86 and 87 at the rear end of the frame. The cable 53*a* extends from the pulley 86 to a pulley 88 and then up to the associated beam 47, as illustrated and described in connection with FIGS. 6 and 12. The cable 53*b* extends over the pulley 87 and a pulley 89 and on up to its associated beam.

The two forwardly extending cables 53*c* and 53*d* extend forward to the front cross bar of the frame and over pulleys 91 and 92, respectively, and then around pulleys 93 and 94, respectively, to their associated beams. Preferably, turn buckles as illustrated in FIG. 6, are provided to permit the separate adjustment of each of the cable lengths for proper rigging of the system.

With this cable actuation system in which all four of the cables are powered by a single actuator, full synchronization of the power mechanism is provided at all times, and as pointed out above, the cables operate only in tension. The cylinder 82 is, therefore, connected only at its forward end to a source of hydraulic fluid under pressure, such as a 12 volt pump, or a hand pump (not illustrated). When the system is pressurized, the piston 83 retracts back into the cylinder 82 to pull in on all of the cables an equal amount. Preferably, the hydraulic system includes an adjustable metering valve such as a needle valve to control the rate of discharge of fluid from the cylinder 82 when the system is exhausted to allow the piston to extend under the influence of the weight of the pontoons in one instance, or of the travel trailer portion of the boat in the other instance.

FIG. 11 illustrates the mechanism for powering the raising and lowering of the stern deck 32. It should be understood that a similar mechanism is utilized to raise and lower the forward deck 21. The stern deck 32 is hinged at 101 to an extension 102 of the cabin floor for movement between a folded position illustrated in phantom at F and an extended position illustrated in phantom at E. In the full line position, the stern deck engages a roller 103 mounted on the inner wall of the stern portion 18 of the pontoon. In the full line position, the pontoon is illustrated in the launch configuration.

As the cabin 10 is raised with respect to the pontoon, the hinge axis 101 is raised with respect to the roller 103 and the rearward deck 32 pivots down toward the extended position E. In such position the rearward deck 32 engages and is supported by angle braces 104, mounted on the pontoons and the roller 103 in its dotted line position does not engage the under side of the rearward deck.

When the cabin is lowered with respect to the pontoon, the hinge 101 drops down with respect to the roller 103 and the roller engages the underside of the rearward deck and raises it to the full line position. After the deck is moved to the full line position by the action of the lowering of the cabin, it is manually raised on up to the folded position and is secured in such position by a chain 106 so that it will not drop down when the pontoons are raised up to the road position. It should be understood that two rollers are provided with one on each pontoon to engage the opposite edges of the stern deck. Similar pairs of rollers are provided on the forward portion 17 of the pontoons to raise and lower the forward deck 21 and again, the forward deck is secured in its travel position by a chain.

A transom mechanism for an outboard motor includes a transom member 108 pivoted on the lower side of the stern deck 32 at 109. The transom member includes a transom plate 111 on which an outboard motor is suitably mounted. The transom member 108 is connected to one end of a thrust tube 112 by a pivot at 113. The other end of the thrust bar is connected by a pivot 114 to a frame extension 116. The four pivots 101, 109, 113 and 114 constitute essentially a parallelogram structure so that the transom member remains in the same substantially vertical position when the stern deck is raised and lowered. Therefore, an outboard motor mounted on the transom plate 101 remains in a vertical position as it moves with the stern deck between the folded position F and the extended position E. Preferably, the pivot 109 is located substantially forward from the transom plate 101 so that the mass of the outboard motor supported by the transom plate will be relatively low in the travel position. With this mechanism, it is not necessary to remove the outboard motor and it is automatically positioned and locked for use as soon as the stern deck 32 is lowered to its extended position E.

Preferably, the pontoons are formed of a core of foam material such as styrafoam, urethane foam, or the like, enclosed within sheet material so that a maximum strength is provided with minimum weight. Further, such structure is used for the decks and the various other panels for the advantages of strength with light weight. Also, such structure provides a very safe boat since all portions of the boat are independently buoyant and if the boat is damaged in a severe storm, it is very unlikely that loss of life would occur. It is preferable that the bottom of the pontoon be sloped upwardly at 121, as best illustrated in FIG. 5, so that the bows of the pontoons are substantially at water level. Such structure enables the boat to be beached effectively, allows the boat to be floated up as close as possible to the launching ramp to enable the towing vehicle to be connected directly to the frame if the ramp is not too steep, and in addition, reduces the likelihood of the forward ends of the pontoons dragging on the ramp as the boat is either launched or pulled out of the water.

In the preferred embodiment, the forward ends of the pontoons are foam filled and the storage space 76 in the forward end of the pontoons terminates at a location spaced back from the forward ends of the pontoons a substantial distance. Relatively thin sheet material is used to form the bows of the pontoons so that in the event that the boat is driven at high speeds onto rocks or the like, the bows of the pontoons can bend and absorb the shock of impact without danger of breaking the pontoon support mechanism. Of course, damage to the pontoons is undesirable, but this ability of the pontoon to absorb excessive impact loads provides safety in that it prevents the pontoons from being broken loose from the cabin systems so that the cabin system is not dropped into the water by the breaking of the pontoon support structure. Since the positive buoyancy provided by the foam core insures that the pontoons will properly float the boat even when they are damaged, a very safe boat system is provided. Preferably, the bows of the pontoons are formed of a separate piece secured to the forward ends of the pontoons so that they may be removed and replaced if severely damaged.

In locations where gasoline is likely to be spilled such as on the rearward deck and the like, a foam material such as gasoline-resistant styrafoam or urethane is utilized so that the foam will not be damaged by the gasoline.

FIG. 12 illustrates a second embodiment of a mechanism for supporting the pontoons. In this embodiment, angle mounting members 131 are again mounted at each corner of the cabin and are connected at their lower ends to the frame 11. The angle members 131, however, are provided with T-shaped support sections 132 wherein the cross of the T is provided by a bar shaped member 133 which extends vertically and serves as a rail along which spaced runners 134 and 136 slide. The two runners 134 and 136 are preferably provided with a self-lubricating bearing material so that the two runners can move vertically up and down along the member 133 with a relatively small amount of friction.

A bolt 137 extends through the beam 138 into the runner 134 and is the upper pivot support for the pontoons. When the pontoons are in the launch position, a bolt receiving tube 139 carried by the beam 138 is in alignment with a threaded opening in the lower runner 136 so that a bolt 141 may be inserted to lock the beam and the pontoons against pivotal movement about the upper pivot bolt 137. To insure that proper alignment is present, the two runners 134 and 136 are connected together by strap members 142.

When it is desired to move the pontoons between the launch position and the water position, the cables are again pulled in or allowed to extend as the case may be, and the two runners move vertically along the rail 133.

A removable pin 143 is positioned beneath the upper runner 134 when it is desired to lock the runners against downward movement. When such pin is in place and the bolts 141 are removed, the beams pivot about the pivot bolt 137 when the cables are retracted or extended to pivot the pontoons between the launched position and the road position. Removal of the pin 143 when the bolts 141 are in position allows the runners to move downwardly along the rail for movement of the pontoons between the launch and water positions. When the runners are in the water position, the pin 143 is inserted through the web of the T to lock the runners in the water position so that the load of the cabin is not carried by the cables.

This second embodiment may be structured to provide substantially any strength and has the advantage of providing a surface contact to support the loads rather than a line contact provided by the rollers of the first embodiment.

With the preferred embodiment of this invention, it is possible to provide a trailable boat which is sufficiently large both in internal cabin space and external deck space, to permit comfortable extended cruising while still permitting the boat to be trailed behind a conventional vehicle. The pontoon arrangement in which the pontoons nest with the cabin in the raised position has the affect of minimizing the increase in cabin height created by the raised pontoons and also lowering the mass center of the pontoons in the road configuration. This is important, since the stability of the trailable boat is adversely affected by the height of the mass of the pontoons and it is desirable to provide a pontoon structure with as low a mass as possible.

Also, because the center section has a decreased height or depth, the side area of the pontoons in the travel condition is minimized so that it is not unnecessarily subjected to excessive wind loading. When the pontoon is in the lowered or water position, the cabin is supported at a substantial distance above the water line to provide substantial freeboard. Consequently, the pontoons have an effective depth equal to the depths of the ends of the pontoons when the pontoons are in the water and a depth equal to the center portion of the pontoon when the pontoons are in the road position.

Although preferred embodiments of this invention are illustrated, it is to be understood that various modifications and rearrangements may be resorted to without departing from the scope of the invention disclosed and claimed.

What is claimed is:

1. A trailable boat comprising a main body including a cabin and road wheels, a pair of pontoons mounted on said body for movement between a raised road position along the roof of said cabin and a lowered water position adjacent to opposite sides of said cabin, said pontoons extending beyond the ends of said cabin and having end portions of a first depth, said pontoons in said water position operating to float said main body with said wheels substantially out of the water and the floor of said cabin substantially above the water while the end portions of said pontoons provide an upper deck surface substantially above the water, said pontoons providing a central portion of reduced depth proportioned to fit over said cabin whereby said pontoons in said road position extend above said roof by a height substantially less than first depth, said end portions projecting below the level of said roof by a distance at least substantially equal to the depth of said central portion when said pontoons are in said road position.

2. A trailable boat as set forth in claim 1 wherein folding walkways substantially level with the upper surface of said end portions bridge over said central portions when said pontoons are in said water position.

3. A trailable boat as set forth in claim 2 wherein folding decks bridge between said end portions of said pontoons when said pontoons are in said water position and provide a substantially level deck assembly in cooperation with said pontoon ends and said walkways.

4. A trailable boat as set forth in claim 3 wherein said level deck is substantially level with the floor of said cabin when said pontoons are in said water position.

5. A trailable boat as set forth in claim 2 wherein a side panel extends between each walkway and said central position of said pontoons when said pontoons are in said water position.

6. A trailable boat as set forth in claim 5 wherein said walkways and side panels fold to a position along said central position in a position between said central portions and the roof of said cabin when said pontoons are in said road position.

7. A trailable boat as set forth in claim 6 wherein said boat includes a forward deck, a folding forward roof is hinged to the forward end of said cabin and is movable between a folded position adjacent to the forward end of said cable and an extended position in which it covers a substantial portion of said forward deck of said boat.

8. A trailable boat as set forth in claim 1 wherein said pontoons provide sufficient displacement at said reduced depth to float said boat, and said end portion providing substantially leveled decks and having the depth substantially greater than twice the depth of said central portions.

9. A trailable boat as set forth in claim 1 wherein said pontoon end portions are hollowed to provide storage chambers, the bottoms of said storage chambers being located above the water line when said pontoons are floating.

10. A trailable boat as set forth in claim 9 wherein said pontoons provide hinged panels providing access to said storage chambers, and said hinged panels when closed constitute part of said upper deck surface.

11. A trailable boat as set forth in claim 10 wherein said storage chambers are surrounded by closed cell foam.

12. A trailable boat as set forth in claim 1 wherein said pontoons are formed of closed cell foam enclosed by sheet material, said central portions of said pontoons being generally rectangular in cross section, and said sheet material including joints which are not water tight whereby the buoyancy of said pontoons is provided by said foam.

13. A trailable boat as set forth in claim 12 wherein said sheet material is aluminum and is bonded to said closed cell foam.

14. A trailable boat as set forth in claim 1 wherein a stern deck is pivoted on said main body for movement between a folded position adjacent to the rearward end of said cabin and an extended position bridging between the ends of said pontoons when said pontoons are in said water position.

15. A trailable boat as set forth in claim 14 wherein motor support means are carried by said stern deck and operate to support an outboard motor for water use when said stern deck is in said extended position and to raise such outboard motor when said stern deck is in said folded position.

16. A trailable boat as set forth in claim 14 wherein a forward deck is pivoted to said main body for movement between a folded position adjacent to the forward end of said cabin and an extended position bridging between the ends of said pontoons when said pontoons are in said water position.

17. A trailable boat as set forth in claim 16 wherein said forward deck includes two panels which fold to fit beneath the ends of said pontoons when said pontoons are in said road position.

18. A trailable boat as set forth in claim 1 wherein said cabin is constructed of panels formed of sufficient closed cell foam enclosed with sheet material to make the cabin itself buoyant.

19. A trailable boat as set forth in claim 1 wherein said cable is provided with a roof constructed of a panel formed of closed cell foam enclosed with sheet material and providing sufficient strength to serve as an upper deck surface.

20. A trailable boat as set forth in claim 1 wherein said pontoons are movable to an intermediate launch position in which the bottoms of said pontoons are above the bottoms of said wheels and in which said pontoons are operable to float said boat with said cabin floor above the water and said wheels within the water, and power means are provided for moving said pontoons between said intermediate position, said raised road position and said lowered water position and folding decks bridge between said end portions of said pontoons when said pontoons are in said water position and provide a substantially level deck assembly in cooperation with said pontoon ends, said decks being pivoted on said main body for movement to a folded position adjacent to the ends of said cabin, and projections are provided on the ends of said pontoons beneath said decks which engage said decks and move them between their folded position and their extended position when said pontoons move between said launch position and said water position.

21. A trailable boat as set forth in claim 1 wherein said pontoons are movable to an intermediate launch position in which the bottoms of said pontoons are above the bottoms of said wheels are in which said pontoons are operable to float said boat with said cabin floor above the water and said wheels within the water, and power means are provided for moving said pontoons between said intermediate position, said raised road position and said lowered water position, said main body being provided with a T shaped track adjacent to each corner of said cabin, and said pontoons provide support beams connected to said track for pivotal movement between said road position and launch position and for linear movement along said tracks when said pontoons move betweenn said launch position and said water position.

22. A trailable boat as set forth in claim 21 wherein runners are supported by said tracks for movement therealong and said beams are connected to said runners.

23. A trailable boat as set forth in claim 1 wherein said upper deck surface of said pontoons is substantially level with the floor of said cabin and said central portions of said pontoon are substantially below the floor of said cabin when said pontoons are in said water position.

24. A trailable boat comprising a generally rectangular cabin structure, a pair of elongated pontoons mounted on said cabin and providing forward and rearward end portions projecting beyond the ends of said cabin and central portions co-extensive with said cabin, said pontoons being movable between a raised trailing position in whih they extend along the roof of said cabin and a water position in which they extend along adjacent to the sides of said cabin and substantially below the floor thereof, said central portion having a first depth and said end portion having a second depth substantially greater than said first depth, said pontoons in their raised position extending above the roof a height substantially no greater than said first depth, said end portions in said water position extending up to substantially the height of said cabin floor while said central portions are substantially below said cabin floor, folding walkways substantially level with the upper surface of said end portions bridging said central portions when said pontoons are in said water position, and folding decks bridging between said forward portions and rearward portions respectively, said walkways cooperating with said end portions and folding decks to provide a substantially level deck system spaced substantially above the central portions of said pontoons when in said water position.

25. A trailable boat comprising a main body including a cabin and road wheels, a pair of pontoons mounted on said body for movement between a raised road position along the roof on the cabin, an intermediate launch position in which the bottoms of the pontoons are along side said cabin above the bottoms of the wheels and in which the pontoons are operable to float said body with the cabin above the water and said wheels within the water, and a lowered water position in which said boat floats with the main body and said wheels substantially out of the water and the floor of the cabin substatially above the water, power means operable to move said pontoons between said intermediate position, said raised road position and said lowered water position, said body being provided with a T shaped track adjacent to each corner of said cabin, and said pontoons provide support beams connected to said tracks for pivotal movement between said road position and launch position and for linear movement along said tracks when said pontoons move between said launch position and said water position, the connection between said beams and said tracks for said linear movement along said tracks being provided by C shaped slide runners.

* * * * *

UNITED STATES PATENT AND TRADEMARK OFFICE
CERTIFICATE OF CORRECTION

PATENT NO. : 4,048,685

DATED : September 20, 1977

INVENTOR(S) : William A. Gail

It is certified that error appears in the above-identified patent and that said Letters Patent are hereby corrected as shown below:

Column 1, line 20, "The" should read --This--.

Column 4, line 47, "cable" should read --cabin--.

Column 4, line 54, "oder" should read --order--.

Column 11, line 18, "systems" should read --system--.

Column 13, line 6, "position" should read --portion--.

Column 13, line 10, "position" (first occurrence) should be -- portion--.

Column 13, line 17, "cable" should read --cabin--.

Column 14, line 6, "cable" should read --cabin--.

Column 14, line 34, "are" should read --and--.

Column 14, line 44, "betweenn" should read --between--.

UNITED STATES PATENT AND TRADEMARK OFFICE

CERTIFICATE OF CORRECTION

PATENT NO. : 4,048,685

DATED : September 20, 1977

INVENTOR(S) : William A. Gail

It is certified that error appears in the above-identified patent and that said Letters Patent are hereby corrected as shown below:

Column 14, line 62, "whih" should read --which--.

Column 15, line 18 "on" should read --of--.

Column 16, line 1, "body" should read --boat--.

Signed and Sealed this

*Tenth* Day of *January 1978*

[SEAL]

*Attest:*

RUTH C. MASON
*Attesting Officer*

LUTRELLE F. PARKER
*Acting Commissioner of Patents and Trademarks*